C. H. FULMER.
Pipe-Wrench.
No. 160,415.  Patented March 2, 1875.
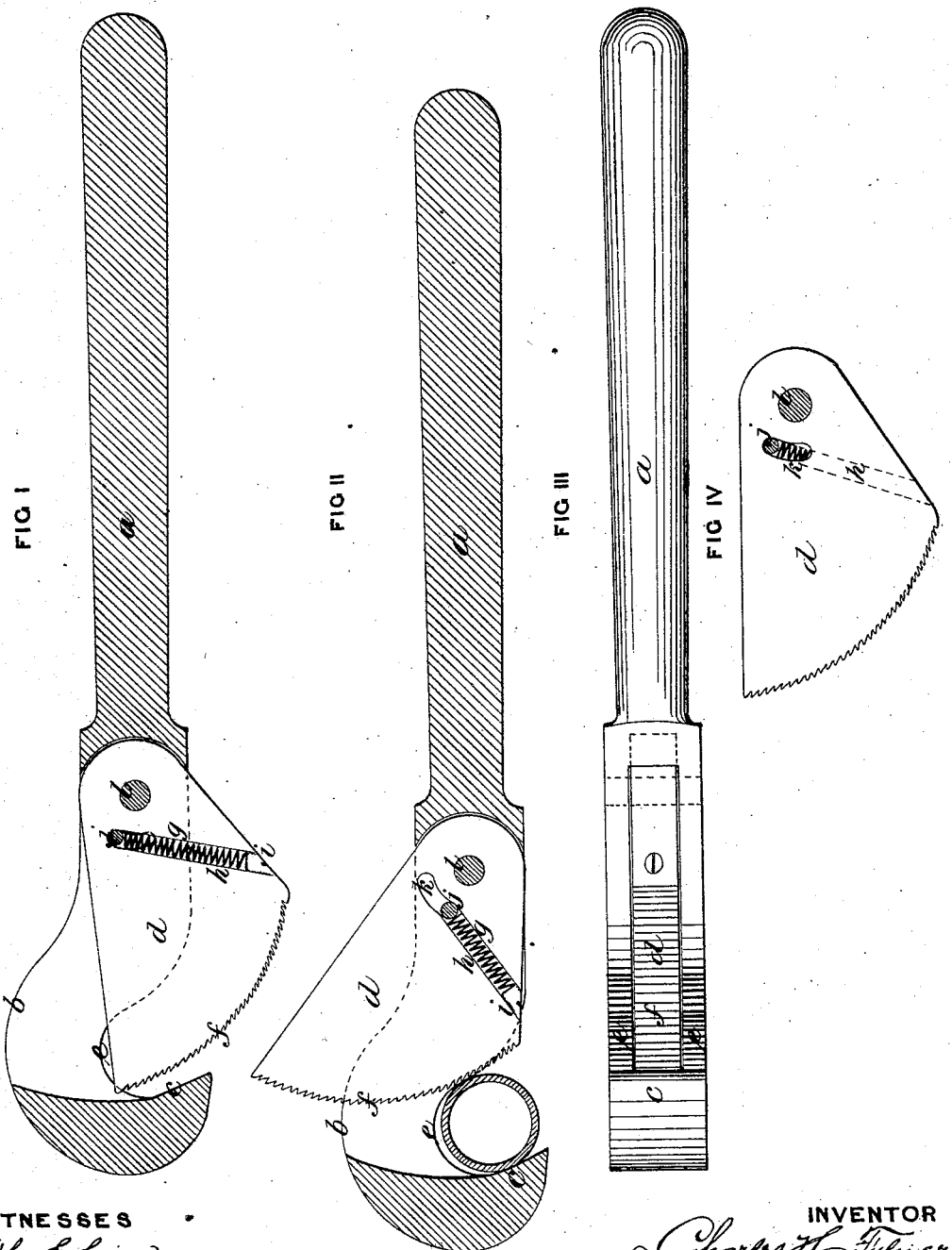

UNITED STATES PATENT OFFICE.

CHARLES H. FULMER, OF INDIANAPOLIS, INDIANA.

IMPROVEMENT IN PIPE-WRENCHES.

Specification forming part of Letters Patent No. 160,415, dated March 2, 1875; application filed January 25, 1875.

*To all whom it may concern:*

Be it known that I, CHARLES H. FULMER, of Indianapolis, in the county of Marion and State of Indiana, have invented certain new and useful Improvements in Pipe-Wrench; and I do hereby declare that the following is a full, clear, and exact description thereof, which will enable others skilled in the art to which it pertains to make and use the same, reference being had to the accompanying drawings and to the letters of reference marked thereon, which form a part of this specification.

My present invention is an improvement upon a patent granted to me on the 25th day of August, 1874, for a pipe-wrench in which a serrated tongue is pivoted within a slotted jaw-bar and arranged to open and close from the closed or seat side of the same, so that, when the wrench is applied with the tongue thrown forward, the pipe will press it back and follow it into the hook. There was no provision, however, for maintaining the tongue in position for use in any way of handling the wrench.

My present invention consists in the combination, with the pivoted serrated tongue arranged to open and close within the jaw-bar from the back or seat side thereof, of a spring fixed within and carried by said tongue, and arranged to bear upon a fixed pin passing through the slot of the jaw-bar, and an opening within the tongue for the purpose of holding the pivoted tongue forward within the hook for application to the pipe in any position in which the wrench may be handled, and thereby avoid the disadvantage of an external arrangement of the spring either upon the bar or the tongue, while obtaining the benefit of the spring to hold the tongue, in applying it for instant griping action, and allowing the free movement of said tongue.

In the accompanying drawings, Figure 1 represents a section of a pipe-wrench embracing my invention, with the tongue pressed forward into the clamping-jaw by the action of the spring upon the jaw-pin; Fig. 2, a similar view, showing the tongue pressed back by contact with the pipe; Fig. 3, an edge view of the same; and Fig. 4, a detached view of the tongue, to show the slot and the spring carried by the tongue.

The jaw-bar $a$ has a goose-neck, $b$, which terminates in an angular hook or jaw, $c$, which, with the pivoted tongue $d$, forms the griping parts for the pipe when placed in the hollow of the goose-neck upon the jaw-seat $e$, with the serrated curved surface $f$ of the tongue acting to clamp the pipe outward against the inner side of the angular hook or jaw. The jaw-bar is slotted to receive the griping-tongue $d$, which is pivoted therein, so as to open and close with the hook from the back or seat side of the jaw-bar, and leave the throat of the jaw free to receive the pipe, with the tongue always in position to bear against the pipe and be borne away by it in placing the wrench upon said pipe. The biting side of the tongue is of such curve as to increase the space between it and the hook in proportion as the tongue is pressed back, to receive different-sized pipes; and as the tongue is pressed away by its contact with the pipe, it does not require the operator to open it to apply the wrench.

In griping the pipe, the serrated tongue stands opposite the hook, so as to press the pipe against the hook from the back side of the jaw-bar; and, in order to maintain the tongue always ready to take hold of the pipe, I combine therewith a spring, $g$, arranged within an interior opening, $h$, in the tongue, secured by a plug, $i$, at the outer edge of the tongue, the inner end of said spring $g$ bearing against a pin, $j$, fixed in the jaw-slot and passing through a slot, $k$, in the tongue, in advance of the tongue-pivot $l$, so as to constantly press the tongue toward the hook.

The spring $g$ is spiral, and is fixed in a hole drilled cross-wise in the tongue, so that its inner end bears upon the pin $j$ in the jaw, and the slot $k$ is made in line with the spring, but with a curve struck from the pivot-pin $l$ of the jaw. This slot is of a length just sufficient to allow of the proper movement of the tongue. The fixed pin $j$ serves the purpose of a stop to limit the projection of the tongue within the hook, and thus prevent the serrated edge from striking the hook $c$ and dulling the serrations.

I claim—

The combination, in a pipe-wrench, of the pivoted tongue $d$, arranged to open and close with the jaw, as described, of a spring, $g$, fixed within and carried by said tongue and a fixed bearing-pin, $j$, in the jaw for said spring, whereby the tongue is always held in position for use without regard to the manner in which the wrench is handled.

In testimony that I claim the foregoing as my own, I have affixed my signature in presence of two witnesses.

CHARLES H. FULMER.

Witnesses:
　LEE A. FULMER,
　M. G. McLAIN.